US007005616B2

(12) United States Patent
Kim et al.

(10) Patent No.: US 7,005,616 B2
(45) Date of Patent: Feb. 28, 2006

(54) COOKING APPARATUS HAVING A PLURALITY OF COOKING SETS TO COOK FOODS IN DIFFERENT COOKING MODES

(75) Inventors: Chul Kim, Yongin (KR); Sung Ho Lee, Hwasung (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/725,581

(22) Filed: Dec. 3, 2003

(65) Prior Publication Data

US 2004/0262288 A1    Dec. 30, 2004

(30) Foreign Application Priority Data

Jun. 26, 2003    (KR)    ...................... 10-2003-0041986

(51) Int. Cl.
*H05B 3/68*    (2006.01)
(52) U.S. Cl. .............................. 219/451.1; 219/452.11; 219/386; 99/339; 99/357
(58) Field of Classification Search ................ 219/451, 219/412, 685, 413, 535, 385, 391, 392, 393, 219/403, 401, 601, 386, 452.11; 99/339, 99/330, 340, 357
See application file for complete search history.

(56) References Cited

U.S. PATENT DOCUMENTS 3,752,955 A * 8/1973 Grove ........................ 219/413
3,823,658 A * 7/1974 Pinchot ........................ 99/340
3,920,944 A * 11/1975 Constable ................... 219/685
4,206,345 A    6/1980 Maass et al. ................ 219/524
4,413,173 A * 11/1983 Grove et al. ................. 219/412
5,680,810 A * 10/1997 Sham ........................... 99/330
5,694,831 A * 12/1997 Haroun et al. ................ 99/339
5,938,959 A * 8/1999 Wang ........................ 219/401

FOREIGN PATENT DOCUMENTS

CA    2031700    * 3/1992
JP    2001-340228    12/2001

OTHER PUBLICATIONS

Hamilton Beach, Healthsmart Indoor/Outdoor Grill (Publication No. 840081900), dated Feb. 2001 (16 pages).

* cited by examiner

*Primary Examiner*—Robin O. Evans
*Assistant Examiner*—Leonid M. Fastovsky
(74) *Attorney, Agent, or Firm*—Staas & Halsey LLP

(57)    ABSTRACT

A cooking apparatus includes an electric heating plate having a heat source therein transmitting heat from the heat source to food, and a cabinet supporting the electric heating plate. The electric heating plate is electrically connected to the cabinet, and is removable from the cabinet. The present invention also provides a cooking apparatus, which allows food to be rapidly heated and cooked using a heat source installed in an electric heating plate, thus shortening cooking time and reducing power consumption. The present invention is also designed such that the electric heating plate is removable from a cabinet, thus allowing the electric heating plate to be conveniently cleaned.

22 Claims, 3 Drawing Sheets

COOKING APPARATUS HAVING A PLURALITY OF COOKING SETS TO COOK FOODS IN DIFFERENT COOKING MODES

CROSS-REFERENCE TO RELATED APPLICATIONS

This application claims the benefit of Korean Application No. 2003-41986, filed Jun. 26, 2003, in the Korean Intellectual Property Office, the disclosure of which is incorporated herein by reference.

BACKGROUND OF THE INVENTION

1. Field of the Invention

The present invention relates, in general, to cooking apparatuses and, more particularly, to a cooking apparatus to cook food using heat conduction.

2. Description of the Related Art

There are cooking apparatuses, such as electric cook-tops which heat and cook food using heat conduction. These cooking apparatuses are designed such that an electric heater installed below a cooking pan heats the cooking pan. The cooking apparatus is used to fry eggs, bake pizzas, and cook pancakes by heating the cooking pan.

However, the conventional cooking apparatus has a problem in that the electric heater used as a heat source is not close to the cooking pan. Thus, a great loss of heat occurs and a long time to heat the cooking pan is required, thus wasting energy. Further, the conventional cooking apparatus has another problem in that the cooking pan is fixed to a cabinet of the cooking apparatus, making it inconvenient to clean the cooking apparatus.

SUMMARY OF THE INVENTION

Accordingly, it is an aspect of the present invention to provide a cooking apparatus designed to transmit heat from a heat source, installed in a cooking set, to food, thus reducing cooking time and power consumption.

It is another aspect of the present invention to provide a cooking apparatus, which is designed such that an electric heating plate is removable from a cabinet, thus being convenient to clean the electric heating plate.

Additional aspects and/or advantages of the invention will be set forth in part in the description which follows and, in part, will be obvious from the description, or may be learned by practice of the invention.

According to an aspect of the invention, a cooking apparatus includes an electric heating plate that has a heat source therein and transmits heat from the heat source to the food, and a cabinet that supports the electric heating plate. The electric heating plate being removable from the cabinet.

According to an aspect of the invention, the heat source is an electric heater.

According to an aspect of the invention, the electric heating plate includes a power connection unit electrically connected to the cabinet, and the cabinet includes a power supply unit electrically connected to the electric heating plate.

According to an aspect of the invention, the power supply unit includes a power cord connected to an external power source, and a contact terminal connected to an end of an electric wire of the power cord.

According to an aspect of the invention, a part of the electric wire is provided in the cabinet.

According to an aspect of the invention, the contact terminal is provided on a surface of the cabinet in such a way as to be exposed to an outside of the cabinet.

According to an aspect of the invention, the power supply unit further includes a water drain hole to discharge remaining water to an outside of the cabinet.

According to an aspect of the invention, the power connection unit includes a heater coil and a heater terminal. The heater terminal is connected to an end of the heater coil.

According to an aspect of the invention, the heater coil is supplied with electricity through the heater terminal to emit heat.

According to an aspect of the invention, the heater terminal is provided on a surface of the electric heating plate in such a way as to be exposed to an outside of the electric heating plate.

According to an aspect of the invention, the power connection unit further includes a dam to prevent flow of remaining water.

According to an aspect of the invention, the above and/or other aspects are achieved by providing a cooking apparatus including a plurality of cooking sets to cook foods in different cooking modes, and a cabinet to support the cooking sets, at least one of the cooking sets being removable from the cabinet.

According to an aspect of the invention, the cooking sets include an electric heating plate. The electric heating plate has a power connection unit to electrically connect a heat source installed in the electric heating plate to the cabinet.

According to an aspect of the invention, the heat source is an electric heater.

According to an aspect of the invention, the cabinet includes a power supply unit to be electrically connected to the cooking sets.

According to an aspect of the invention, the cooking sets include an electric toaster.

BRIEF DESCRIPTION OF THE DRAWINGS

These and other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
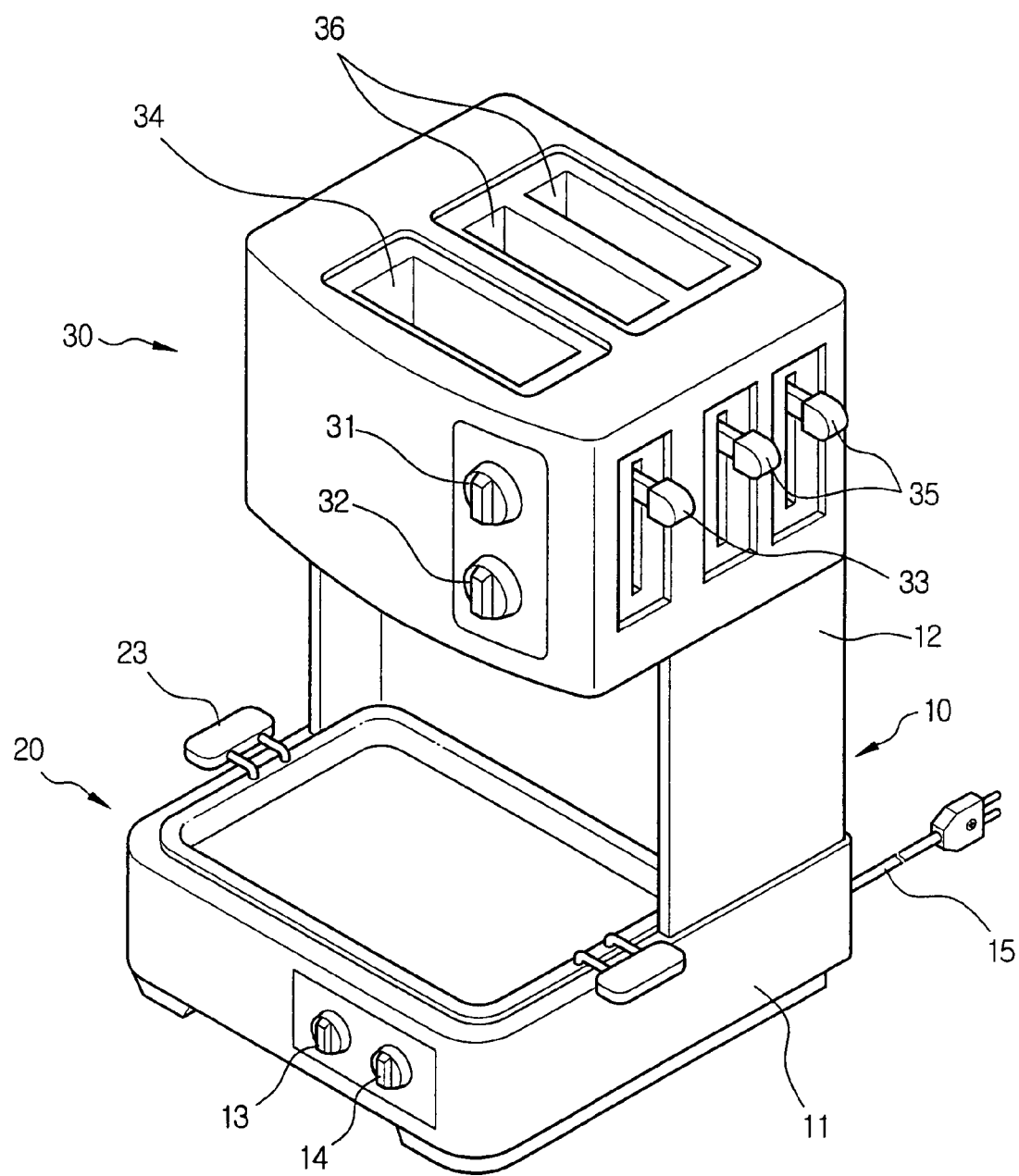
FIG. 1 is a perspective view of a cooking apparatus, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a perspective view of a cooking apparatus, according to an embodiment of the present invention, and illustrates the cooking apparatus having a plurality of cooking sets that cook foods in different cooking modes and are integrated with each other into a single structure, as an example.

As illustrated in FIG. 1, according to the present invention, the cooking apparatus includes a lower cooking set 20 (hereinafter referred to as an electric heating plate), an upper cooking set 30, and a cabinet 10 to support the lower and upper cooking sets 20 and 30, respectively. The electric heating plate 20 is used for frying eggs, baking pizzas, and cooking pancakes. The upper cooking set 30 is used for baking bread and frying sausages, bacon, etc., and includes an electric toaster.

The electric heating plate 20 has a heat source therein. An electric heater is used as the heat source.

The cabinet 10 includes a support unit 12 and a power cord 15. The support unit 12 supports the upper cooking set 30, and a lower casing 11 supports the electric heating plate 20. The power cord 15 transmits external power to the cabinet 10. Further, a heater power control switch 13 to set a heater power and a timer 14 to set cooking time are installed on a surface of the cabinet 10.

First and second slots 34 and 36, into which food to be cooked is inserted, are provided at a top wall of the upper cooking set 30. When a grill mode is selected, food is inserted into the first slot 34. On the other hand, when a toast mode is selected, food is inserted into the second slots 36. That is, the first slot 34 constitutes a grill unit. The second slots 36 constitute a toaster unit.

A grill control lever 33 and a toaster control lever 35 are provided at a surface of the upper cooking set 30. The grill control lever 33 functions to turn on or off the grill unit, while the toaster control lever 35 functions to turn on or off the toaster unit. Further, a grill power control switch 31 to set a grilling power and a toaster power control switch 32 to set a toasting power are installed at a surface of the upper cooking set 30.

Figure 2:
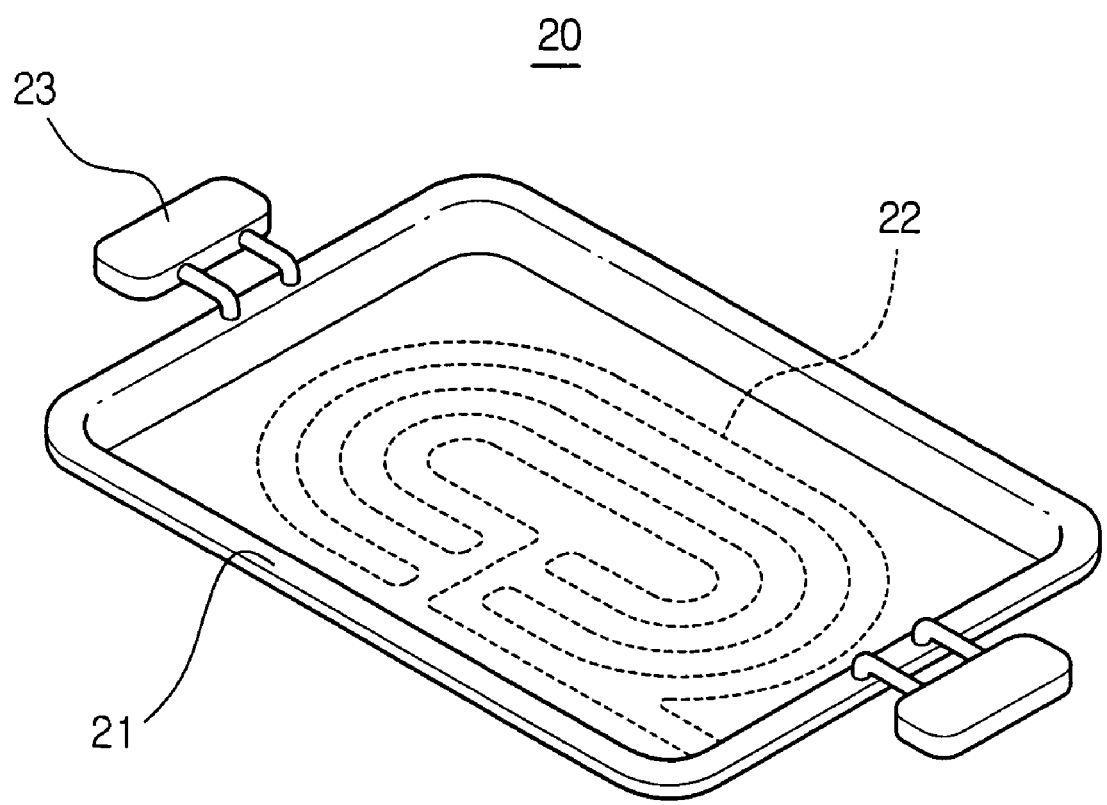
FIG. 2 is a perspective view showing an electric heating plate included in the cooking apparatus of FIG. 1.
Figure 3:
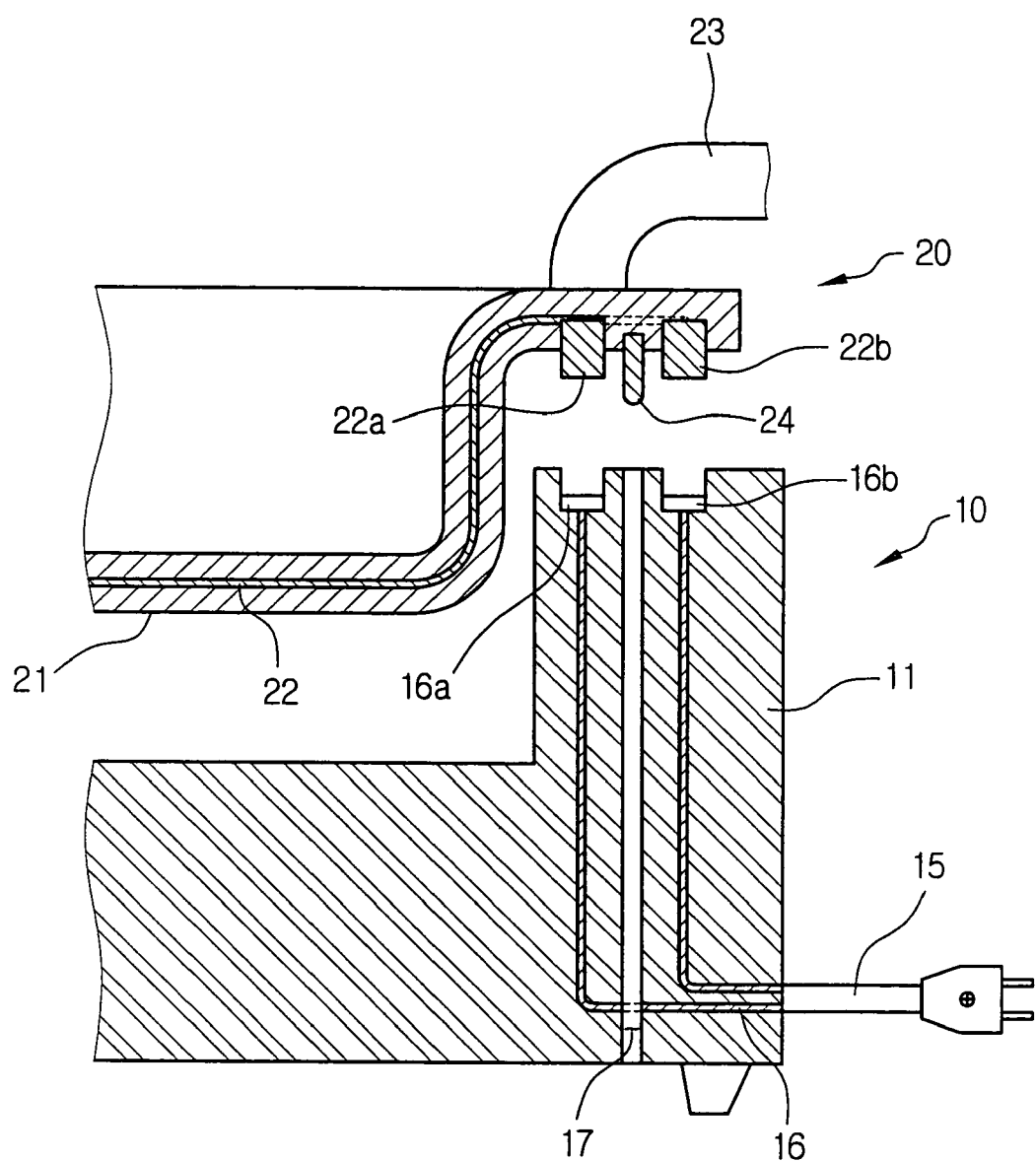
FIG. 3 is a sectional view showing a structure to connect the electric heating plate to a cabinet of the cooking apparatus of FIG. 1.

FIG. 2 is a perspective view showing the electric heating plate included in the cooking apparatus of FIG. 1. FIG. 3 is a sectional view showing a structure to connect the electric heating plate to the cabinet of the cooking apparatus of FIG. 1.

The electric heating plate 20 includes a power connection unit electrically connected to the cabinet 10. The cabinet 10 includes a power supply unit electrically connected to the electric heating plate 20.

The power supply unit of the cabinet 10 includes the power cord 15 and first and second contact terminals 16a and 16b. An external power source is supplied to the cabinet 10 through the power cord 15. The first and second contact terminals 16a and 16b are connected to ends of electric wires 16 of the power cord 15. A part of the electric wires 16 is arranged in the lower casing 11. The contact terminals 16a and 16b are provided on an upper surface of the lower casing 11 in such a way as to be exposed to an outside of the lower casing 11.

The power connection unit of the electric heating plate 20 includes a body 21, a heater coil 22 and first and second heater terminals 22a and 22b. In this case, the heater coil 22 is embedded in the body 21. Two handles 23 are mounted at an edge of the electric heating plate 20 so that a user can easily remove the electric heating plate 20 from the cabinet 10.

The body 21 is made of a heat-resistant insulation material, such as ceramic-coated aluminum. The body 21 is bent along an edge thereof in such a way that the body 21 is seated on the lower casing 11. The body 21 is a flat plate on which food is laid. Heat is transmitted from the heater coil 22 to a bottom of the body 21, thus heating and cooking the food placed on the body 21.

A nicrome wire is generally used as the heater coil 22. The first and second heater terminals 22a and 22b are connected to ends of the heater coil 22, and are provided on a surface of the electric heating plate 20 in such a way as to be exposed to an outside of the electric heating plate 20. The heater coil 22 is supplied with electricity through the heater terminals 22a and 22b to emit heat.

The power connection unit of the electric heating plate 20 also includes a dam 24 to prevent a flow of remaining water. The power supply unit of the cabinet 10 also includes a water drain hole 17 to discharge remaining water to be outside of the cabinet 10. That is, the dam 24 is inserted into the water drain hole 17, and water remaining on the dam 24 is discharged to the outside of the cabinet 10 through the water drain hole 17. Therefore, after the body 21 is washed the dam 24 guides water remaining on the surface of the body to the water drain hole 17. This is because the remaining water may cause an accident such as a short circuit.

When the electric heating plate 20 is mounted on the lower casing 11 of the cabinet 10, the heater terminals 22a and 22b are connected to the contact terminals 16a and 16b. In this case, an external power is transmitted through the power cord 15 and through the electric wires 16 to the heater terminals 22a and 22b. The heater coil 22 emits heat because of the electricity transmitted from the heater terminals 22a and 22b, and the heat is transmitted to the food laid on the body 21.

When the electric heating plate 20 is removed from the lower casing 11 of the cabinet 10 to clean the electric heating plate 20, the heater terminals 22a and 22b are disconnected from the contact terminals 16a and 16b. Simultaneously, the external power source supplied to the heater terminals 22a and 22b through the power cord 15 is interrupted.

The dam 24 is provided between the first and second heater terminals 22a and 22b in such a way as to be downwardly projected. The dam 24 prevents the flow of water remaining around the heater terminals 22a and 22b. Further, water remaining on a projected part of the dam 24 is discharged to the outside of the cabinet 10 through the water drain hole 17.

As apparent from the above description, the present invention provides a cooking apparatus, which allows food to be rapidly heated and cooked using a heat source installed in an electric heating plate, thus shortening the cooking time and reducing power consumption, and which is designed such that the electric heating plate is removable from a cabinet, thus allowing the electric heating plate to be conveniently cleaned.

Moreover, it is understood that other kinds of heating units can be used in the upper cooking set, such as those for steaming or boiling food or which are used to bake breads.

Although embodiments of the present invention have been shown and described, it would be appreciated by those skilled in the art that changes might be made in the embodiment without departing from the principles and spirit of the invention, the scope of which is defined in the claims and their equivalents.

What is claimed is:

1. A cooking apparatus to cook food, comprising:
an electric heating plate having a heat source and which transmits heat from the heat source to food;
a cabinet supporting the electric heating plate, the electric heating plate being removable from the cabinet; and an upper cooking set including at least one slot for cooking food, and at least one lever and at least one power control device controlling power to the at least one slot, wherein the electric heating plate comprises a power connection unit electrically connected to the cabinet, and wherein the power connection unit includes a dam.

2. The cooking apparatus according to claim 1, wherein the heat source is an electric heater.

3. The cooking apparatus according to claim 1, wherein the cabinet comprises a power supply unit electrically connected to the electric heating plate.

4. The cooking apparatus according to claim 3, wherein the power supply unit comprises:
- a power cord connected to an external power source; and
- a contact terminal connected to an end of an electric wire of the power cord.

5. The cooking apparatus according to claim 4, wherein a part of the electric wire is provided in the cabinet.

6. The cooking apparatus according to claim 4, wherein the contact terminal is provided on a surface of the cabinet in such a way as to be exposed to an outside of the cabinet.

7. A cooking apparatus to cook food, comprising:
- an electric heating plate having a heat source and which transmits heat from the heat source to food;
- a cabinet supporting the electric heating plate, the electric heating plate being removable from the cabinet; and
- an upper cooking set including at least one slot for cooking food, and at least one lever and at least one power control device controlling power to the at least one slot, wherein the cabinet comprises a power supply unit electrically connected to the electric heating plate, and wherein the power supply unit further comprises a water drain hole to discharge remaining water to an outside of the cabinet.

8. The cooking apparatus according to claim 1, wherein the power connection unit comprises a heater coil and a heater terminal, the heater terminal being connected to an end of the heater coil.

9. The cooking apparatus according to claim 8, wherein the heater coil is covered with a heat-resistant insulation material and supplied with electricity through the heater terminal to emit heat.

10. The cooking apparatus according to claim 8, wherein the heater terminal is provided on a surface of the electric heating plate in such a way as to be exposed to an outside of the electric heating plate.

11. The cooking apparatus according to claim 8, wherein the dam prevents a flow of remaining water.

12. A cooking apparatus, comprising:
- a plurality of cooking sets to cook foods in different cooking modes; and
- a cabinet to support the cooking sets, at least one of the cooking sets being removable from the cabinet, wherein the cooking sets comprise an electric heating plate, the electric heating plate including a power connection unit electrically connecting a heat source installed in the electric heating plate to the cabinet, and wherein the cower connection unit includes a dam.

13. The cooking apparatus according to claim 12, wherein the heat source is an electric heater.

14. The cooking apparatus according to claim 12, wherein the cabinet comprises a power supply unit electrically connected to the cooking sets.

15. The cooking apparatus according to claim 12, wherein the cooking sets comprise an electric toaster.

16. A cooking apparatus, comprising:
- a cooking set including at least one slot for cooking food, and at least one lever and at least one control device controlling power to the at least one slot;
- a casing including at least one heating plate, and
- a cabinet disposed between and supporting the cooking set and the casing, wherein one of the heating plate and the cooking set is removable from the cabinet, wherein the removable heating plate includes a power connection unit electrically connected to the cabinet, and wherein the power connection unit includes a dam.

17. The cooking apparatus according to claim 16, wherein the cabinet further comprises a power cord supplying external power to the cabinet.

18. A cooking apparatus to cook food comprising:
- a cooking set including at least one slot for cooking food, and at least one lever and at least one control device controlling power to the at least one slot;
- a casing including at least one heating plate; and
- a cabinet disposed between and supporting the cooking set and the casing, wherein one of the heating plate and the cooking set is removable from the cabinet, wherein the heating plate is removable, and the casing further comprises a heater power control switch to set a heat power of the removable heating plate and a timer to set cooking time of the removable heating plate.

19. The cooking apparatus according to claim 16, wherein the power connection unit further includes a body, a heater coil, and at least one heater terminal.

20. The cooking apparatus according to claim 19, wherein the body is made of a heat-resistant insulation material.

21. The cooking apparatus according to claim 19, wherein the body is bent along an edge.

22. The cooking apparatus according to claim 16, wherein the cooking apparatus is a countertop cooling apparatus.

* * * * *

UNITED STATES PATENT AND TRADEMARK OFFICE
CERTIFICATE OF CORRECTION

PATENT NO. : 7,005,616 B2
APPLICATION NO. : 10/725581
DATED : February 28, 2006
INVENTOR(S) : Chul Kim et al.

It is certified that error appears in the above-identified patent and that said Letters Patent is hereby corrected as shown below:

On the cover page, (56) References Cited, FOREIGN PATENT DOCUMENTS, column 2, line 1, after "3/1992" insert --A47J 37/08--

Column 6, line 7, change "cower" to --power--

Column 6, line 30, change "food" to --food,--

Signed and Sealed this

Fifteenth Day of August, 2006

JON W. DUDAS
*Director of the United States Patent and Trademark Office*